May 20, 1969 R. A. DISCHERT ET AL 3,445,590

COORDINATED SENSITIVITY AND AMPLIFICATION CONTPOL SYSTEM

Filed March 19, 1965 Sheet 1 of 3

INVENTORS
ROBERT A. DISCHERT &
NORMAN L. HOBSON
BY W. H. Sprague
Attorney

INVENTORS
ROBERT A. DISCHERT &
NORMAN L. HOBSON
BY W. H. Sprouagle
Attorney

COORDINATED SENSITIVITY AND AMPLIFICATION CONTROL SYSTEM

Filed March 19, 1965 Sheet 3 of 3

INVENTORS
ROBERT A. DISCHERT &
NORMAN L. HOBSON
BY W. H. Sprague
Attorney

United States Patent Office 3,445,590

Patented May 20, 1969

3,445,590

COORDINATED SENSITIVITY AND AMPLIFICATION CONTROL SYSTEM

Robert A. Dischert, Burlington, and Norman L. Hobson, Pennsauken, N.J., assignors to Radio Corporation of America, a corporation of Delaware Filed Mar. 19, 1965, Ser. No. 441,124

Int. Cl. H04n *5/40;* H03g *3/30*

U.S. Cl. 178—7.2 12 Claims

ABSTRACT OF THE DISCLOSURE

In a signalling system including a transducer for producing a signal in response to and representative of energy impinging thereon, apparatus is provided which is responsive to a variation of the signal level from the transducer to alter the sensitivity of the transducer and which also includes a gain controlled amplifier which normally produces an amplified version of the transducer output signal and which amplifier is also responsive to a limit sensitivity of the transducer to alter the gain of the amplifier.

This invention relates to the automatic control of signal generating and/or processing apparatus and particularly to the coordination of a sensitivity control system for one apparatus with the amplification control system for another apparatus.

Where transducing apparatus is used to convert input intelligence of one form into output intelligence of another form, it frequently is the practice to automatically control the sensitivity of the transducing apparatus so as to maintain the average level of the transducer output intelligence substantially constant despite any changes in the average level of the transducer input intelligence. Also, where amplifying apparatus is used to amplify intelligence in the form of electrical signals, for example, it often is the practice to automatically control the gain (i.e. amplifying capability) of the amplifying apparatus so as to maintain the average level of amplifier output intelligence substantially constant despite any changes in the average level of the amplifier input intelligence.

When the input intelligence of the amplifying apparatus is the output intelligence of the transducing apparatus and when both types of automatic controls are used, extreme conditions of the input intelligence to the transducer sometimes are encountered. Under such conditions the operation of the automatic sensitivity control system causes the production in the output of the transducer of undesired spurious effects which tend to mask the desired output intelligence. In response to such a mixed input to the amplifier the automatic gain control system, in attempting to effect the amplification of the partially masked intelligence, also causes the amplification of the undesired spurious effects, thereby producing a signal in the amplifier output which is unsatisfactory for use. In many cases it is considered better to have no signal at all than to have one which is so mutilated.

An illustrative examle of a case in which such a problem is encountered is in television video signal generating apparatus. It is customary in the operation of video signal generating apparatus, particularly that used for producing signals from motion picture film, to make suitable provisions for automatically changing the sensitivity of the pickup device as the amount of light impinging upon the device varies so as to maintain a substantially constant level of video signals in the output from the pickup device. It also is customary to provide amplifiers for the video signal which include an automatic gain control facility, again directed to the end of maintaining a substantially constant level of video signals.

In the operation of such apparatus there are conditions under which the video signal level derived from the pickup device is less than desired despite an increase in the sensitivity of the pickup device. Under such conditions the gain control apparatus functions to increase the video signal level by increasing the gain of the amplifiers. When both sensitivity and gain controls are automatic, there are conditions encountered in which the sensitivity of the pickup device is increased to the point where only a weak signal comprising principally undesired spurious signals are derived. An example of such a situation is when the subject is in the form of motion picture film and the picture recorded thereon fades to black. The automatic gain control apparatus, functioning in response to such weak signals, increases the amplifier gain and the spurious signals are amplified beyond any practical useful point.

It is an object of the present invention, therefore, to interlock the automatic sensitivity control apparatus of a transducer, such as a television camera, with the automatic gain control apparatus of a signal amplifier in such a way that the amplifier is effectively disabled when the sensitivity control has reached a predetermined limit.

In accordance with an illustrative embodiment of the invention, the automatic sensitivity control apparatus for a television camera pickup tube is provided with means to select a predetermined sensitivity limit. The sensitivity of the pickup tube is altered, such as for example, by varying the effective potential between the electron scanning beam cathode and the scanned target electrode. The sensitivity control limiting device determines the maximum cathode-to-target potential which the operator deems suitable for a particular use of the camera equipment. This limiting target voltage is effectively sensed and applied to the automatic gain control apparatus in such a way that the spurious signals derived from the pickup device are not amplified, thereby obviating the inclusion of such signals in the output of the camera apparatus.

For a better understanding of the invention, reference is made to the following description which is taken in conjunction with the accompanying drawings of which:

FIGURE 3 is a schematic circuit diagram of the automatic sensitivity control apparatus corresponding to that shown in FIGURE 1.

Figure 1:
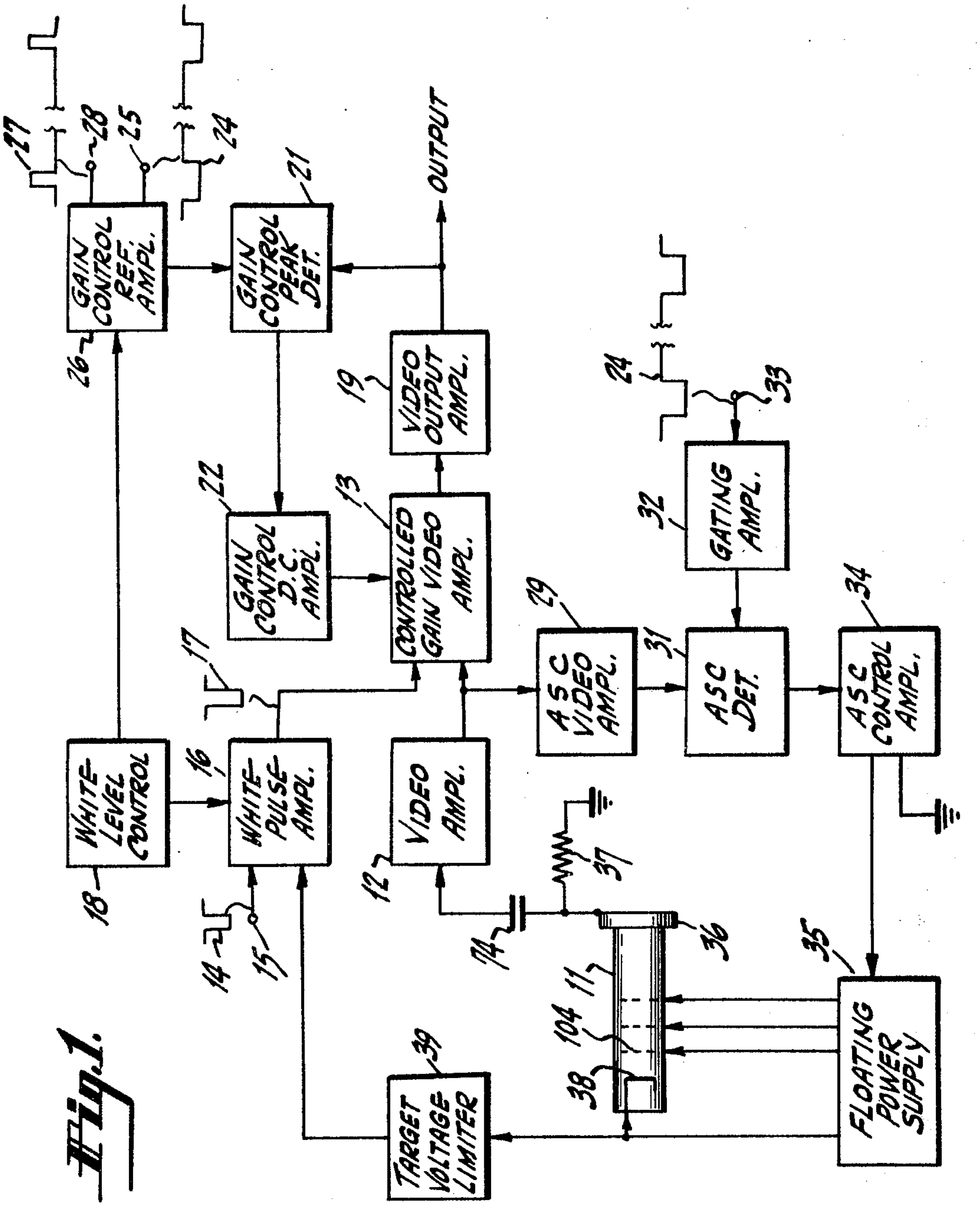
FIGURE 1 is a block diagram of the essential elements of one practical embodiment of the invention.

Referring now to FIGURE 1 of the drawings, the chain of apparatus by which the video signal derived from the pickup device is processed for transmission will be described generally in terms of the various functions performed as represented by the blocks shown in this figure. A video signal derived from the pickup device 11 is impressed upon the input of a video amplifier 12. This amplifier may consist of one or more stages, the output signal from which is impressed upon one input circuit of a controlled gain video amplifier 13. A train of white pulses 14, available at a terminal 15 during horizontal blanking intervals are amplified in a white pulse amplifier 16 to produce a train of amplified white pulses 17 for impression upon another input of the gain controlled amplifier 13. The amplitude of the white pulses 17 impressed upon the amplifier 13 is subject to manual variation by means of circuitry (subsequently disclosed in detail) included in white level control apparatus 18; and by the white pulses are used to control the gain of the amplifier 13. In accordance with this invention, the white pulse amplitude also is subject to automatic control in a manner later to be described. The purpose of such amplitude variations also will be explained subsequently. The white pulses 17 are added to the video signal in the amplifier 13 during horizontal blanking intervals to produce a composite video signal in the output circuit of this amplifier which includes a video signal portion having white and black signal peaks during the trace period of each horizontal scanning interval and having white pulses during the retrace period of each horizontal scanning interval. The particular way in which the gain controlled amplifier 13 has its degree of amplification controlled will be subsequently described in connection with FIGURE 2.

The composite video signal derived from the controlled gain amplifier 13 is impressed upon other signal processing apparatus (not shown) and ultimately upon an output amplifier 19 for impression upon an output circuit from which it is applied to suitable utilization apparatus for eventual transmission.

The video signal appearing at the output of the video output amplifier 19 is coupled to the input of a gain control peak detector 21. This detector normally responds to either the peak white video signals occurring during the scanning interval or to the white pulses 17 occuring during the retrace interval depending upon whether automatic or manual gain controlling operation is in effect. The detector produces in its output circuit a unidirectional voltage which is amplified in a gain control DC amplifier 22 and applied to a variable gain control circuit associated with the controlled gain amplifier 13.

If it is desired to effect automatic gain control of the video signal, a gating pulse 24 is applied to one terminal 25 of a gain control reference amplifier 26 which is biased so as to establish a reference level relative to which the peak detector 21 operates. The detector is operative during the horizontal scanning intervals to detect the peak white video signals and is rendered inoperative during horizontal retrace intervals by the gating pulses 24. In accordance with a later to be described feature of the invention, the detector 21 also is rendered capable of operation for a portion of each horizontal retrace interval by horizontal drive pulses 27 applied to terminal 28. The reference level for the detector is determined by controlling the biasing of the reference amplifier 26, partly from within the amplifier and partly from the white level control apparatus 18 as will be disclosed in detail subsequently.

When manual gain control is desired by means of the white pulses 17 in the composite signal, the operational capability of the detector 21 is controlled by the horizontal drive pulses 27 applied to terminal 28 of the gain control reference amplifier 26. The pulses 27 effectively render the peak detector 21 inoperative during horizontal trace periods and operative only during horizontal retrace periods. For this type of operation, the biasing control of the amplifier 26 from the white level control apparatus 18 is discontinued and a fixed bias only is applied to the reference amplifier 26 from within the amplifier itself. The detector 21 then responds only to the white pulses 17, the amplitude of which is controlled from the white level control apparatus 18 as previously described. In accordance with a feature of the present invention, however, the white pulse amplitude is subject to other controls which will be described subsequently.

The performance of either the automatic or manual gain controlling function does not, however, effect any compensation for variations of the amplitude of the video signals derived from the pickup device 11, such as those which may be caused, for example, by variations in the average light admitted to the pickup device from the subject. For this purpose there is provided an automatic sensitivity control video amplifier 29 which derives a signal from the output of the video amplifier 12. This signal is passed to an automatic sensitivity control detector 31 which is under the control of a gating amplifier 32 so as to eliminate from the signal any effects which may be present in the signal during blanking intervals. Although the signal derived from the video amplifier 12 has not at that point been processed to include special signals during the horizontal blanking intervals such as the white pulses 17, the blanking of the pickup device during the horizontal retrace intervals may produce unwanted spurious transient effects which should be removed from the signal before it is detected for automatic sensitivity control purposes. Hence, the gating amplifier 32 renders the detector 31 operative during all but the first and last parts of the horizontal trace intervals by means such as the described gating pulses 24 applied to terminal 33 of the amplifier 32. By such means, any spurious signal effects, such as those caused by blanking of the pickup device 11, are removed from the video signal which is impressed upon the automatic sensitivity control detector 31 to produce a unidirectional control voltage.

This voltage, after suitable amplification by an amplifier 34, is impressed upon the floating (i.e. ungrounded) power supply 35 for the image pickup device 11. The control voltage derived from the amplifier 34 is applied to vary the effective target voltage of the pickup tube 11 (and, thus, the tube's sensitivity) so as to maintain substantial amplitude uniformity of the video signal derived from the pickup device and impressed upon the video signal amplifying and processing circuits such as those previously described. Sensitivity of the pickup device may also be varied by using the control voltage to control a motor, for example, by which an iris diaphragm or variable neutral density filter may be changed to alter the amount of light entering the pickup device from the subject.

The effective target voltage of the pickup tube 11 is varied by grounding the target 36 through a resistor 37 and by altering the voltages derived from the floating power supply 35 relative to ground. Thus, the voltage applied to the cathode 38 of the tube 11 is changed relative to ground, thereby effecting the necessary change in the cathode-to-target voltage for altering the camera sensitivity. By supplying operating potentials to the other electron scanning beam control electrodes of the pickup tube 11 from the floating power supply 35 these electrodes are maintained in a fixed potential relationship to one another and to the cathode 38.

The voltage effectively applied to the cathode 38 of the pickup tube 11 and which is representative of the voltage of the target 36 is applied to a target voltage limiter 39. This device may be set for different limiting voltages, as will be described subsequently, so that when the limiting voltage is reached a control signal is applied to the white pulse amplifier 16 which is effective to cause the automatic gain controlling apparatus to reduce the video signal amplifier gain.

Thus, as the light input to the pickup tube 11 decreases, which tends to reduce the level of the video signals applied to the video amplifier 12, the sensitivity of the tube 11 is increased such as by increasing the effective target voltage or by equivalent means as described. By such means the video signals applied to the amplifier 12 are maintained substantially at a desired level and the automatic gain controlling apparatus functions normally. Should the light input to the pickup tube 11 decrease effectively to zero such as when a motion picture film subject fades to black, the output from the pickup tube, such as a device having a photoconductive target, produces essentially only a spurious output which is derived from what is known as "dark current." Such an output is one which it is desired to suppress. As previously described, the sensing of such an output causes the automatic sensitivity control apparatus to increase the effective cathode-to-target voltage of the tube 11 to increase its sensitivity. This operation only serves to increase the amplitude of such undesired spurious signals. When the sensitivity of the tube is increased to the point represented by the setting of the target voltage limiter 39, the control signal which is produced by the limiter and applied to the white pulse amplifier 16 produces a white pulse 17 in the amplifier output. This pulse is of sufficient amplitude that, when it is added to the video signal in the input circuit of the controlled gain video amplifier 13, it causes the automatic gain control apparatus to reduce the gain of the video amplifier 13 to the point where the spurious output from the pickup tube 11 is reduced to such a low level that no undesired signal effects are produced in the output from amplifier 19.

Figure 2:
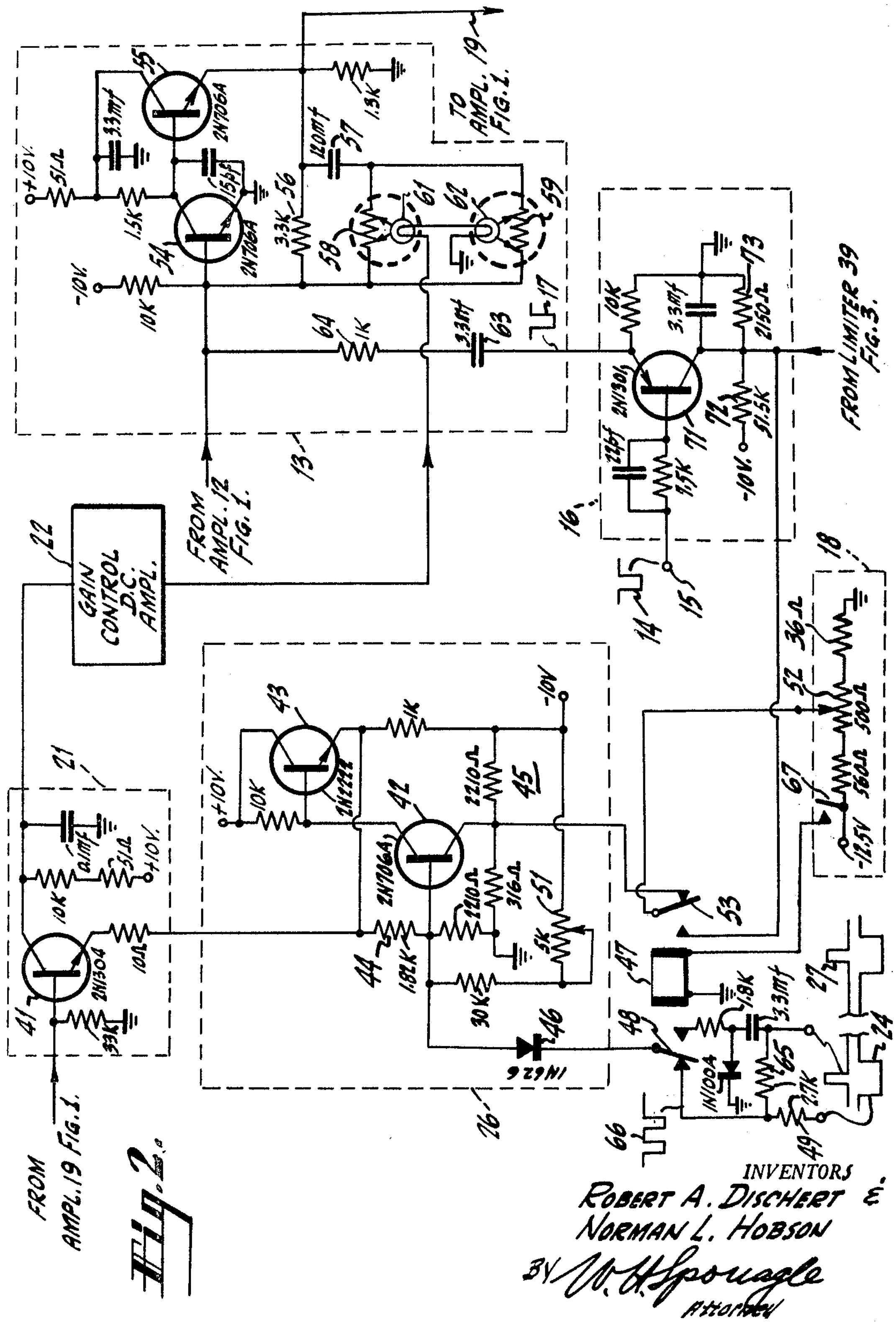
FIGURE 2 is a schematic circuit diagram of that portion of the apparatus of FIGURE 1 by which the video signal gain control is effected.
Figure 7:
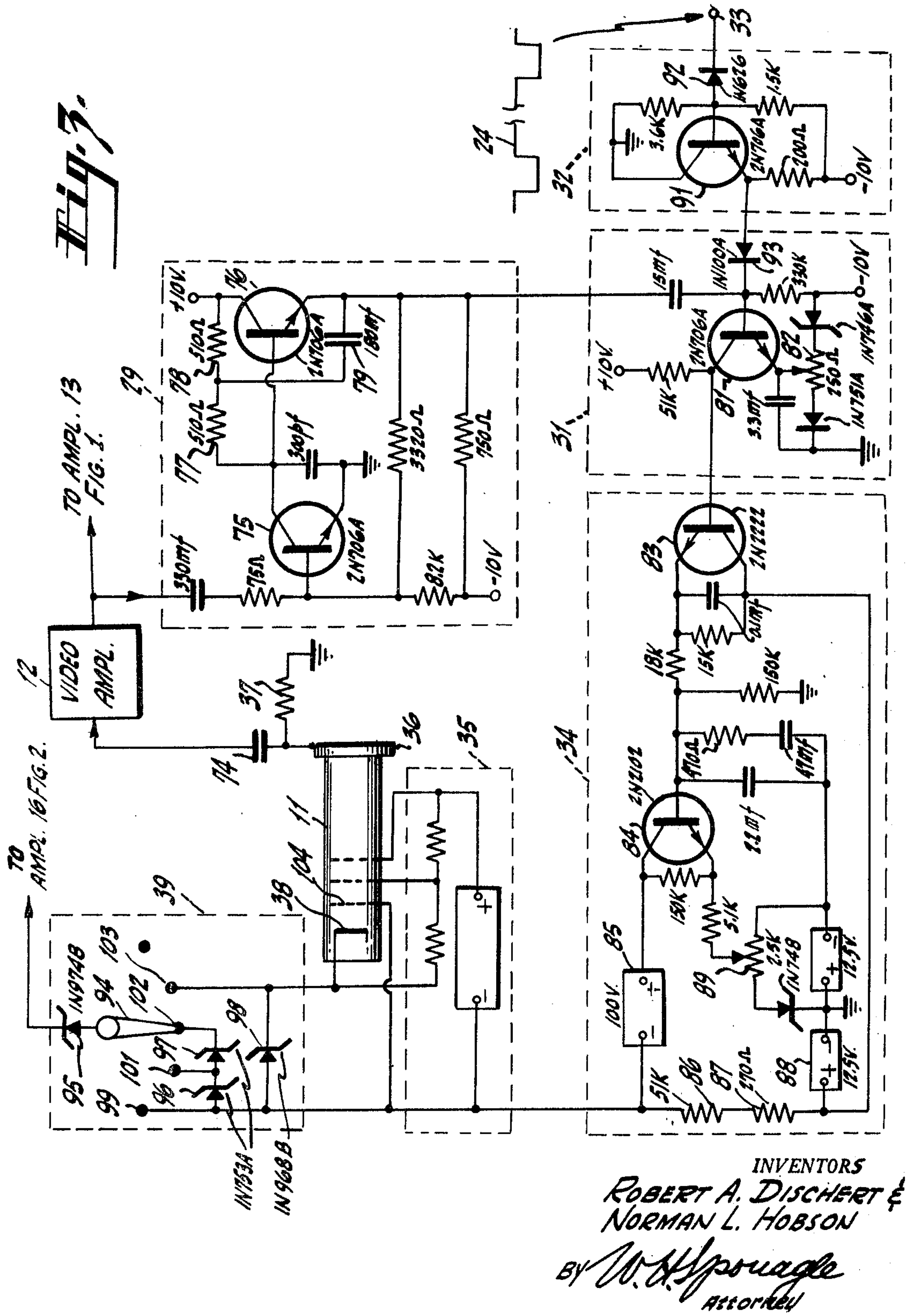

Reference now is made to FIGURE 2 for a detailed explanation of the operation of the apparatus by which gain control is achieved, whereby to maintain the peak white video signals at a preselected amplitude relative to the blanking level of the video signal. As previously described, gain control of the video signal is accomplished by detecting either the peak white video signals occurring during horizontal trace intervals or the white pulses occurring during horizontal retrace intervals. The detector 21 includes a transistor 41 which receives a signal at its base electrode derived from the video output amplifier 19 of FIGURE 1 in which white signals are positive-going and black signals are negative-going. This signal effectively is compared with a reference voltage applied to the emitter electrode of the transistor 41 so as to produce at the collector electrode a D.C. voltage representing any difference between the peak video signal and the reference voltage.

The reference voltage derived from the gain control reference amplifier 26 is selected by suitably controlling the voltages applied to and derived from the transistors 42 and 43 which are connected as a feed back pair in which the collector electrode of the input transistor 42 drives the base electrode of the output transistor 43 and the emitter electrode of the output transistor is coupled by a feedback resistor 44 to the base electrode of the input transistor. The resistor 44 also supplies the reference voltage to the peak detector transistor 41. The input transistor 42 serves to combine two signal effects: (1) the D.C. signal impressed upon its emitter electrode from the voltage divider 45 alone or in conjunction with the control apparatus 18; and (2) the pulse signal (either the gating pulse 24 or the horizontal drive pulse 27 or both) impressed upon its base electrode by the circuit including a diode 46. The voltage developed at the emitter electrode of the output transistor 43, therefore, is an additive combination of the D.C. and pulse signals applied to the input transistor 42.

For the purpose of this description assume that it is desired to effect gain control automatically in response primarily to the peak white signals occurring during the horizontal trace intervals. A relay 47 is de-energized so that through its contact 48, in its unoperated position shown, the gating pulse 24 is applied in the polarity shown to the base circuit of the input transistor 42 through a resistor 49 and the diode 46. The polarity of the gating pulse 24 is such that, during all of the horizontal trace interval, there is no current flow in the circuit through diode 46.

The input transistor 42 is biased under the joint control of apparatus including the voltage divider 45 and a variable resistor 51, both located at the camera or pickup apparatus, and a potentiometer 52, located in the gain control apparatus 18 which generally is at a point remote from the camera or pickup apparatus. The potentiometer is connected to the gain control reference amplifier by contact 53, in its unoperated position shown, of the relay 47. The biasing of the transistor 42 is such that the collector-to-emitter conduction in the transistor 43 causes a voltage to be applied to the emitter electrode of the detector transistor 41 establishes a threshold level. White peaks of the video signal applied to the base electrode of transistor 41 which exceed this threshold level cause the transistor 41 to conduct.

Increases in the positive-going amplitude of the white signal peaks impressed upon the base electrode of the detector transistor 41, increase the average conduction in the collector-to-emitter circuit of the transistor to produce a less positive DC output signal. This DC signal is applied to the gain control DC amplifier 22 and thence to the variable gain circuit of the controlled gain video amplifier 13 to decrease the gain of the amplifier in a manner to be particularly described presently. Thus, the peak white amplitude of the video signal is decreased so that it is restored to the amplitude selected by the described control facilities including the potentiometer 52 of the gain control apparatus 18.

Any decrease in the amplitude of the white peak video signals from the selected amplitude renders the detector transistor 41 inoperative so that the DC voltage derived from the collector decreases (becomes more positive) by operation of the time constant circuit associated with the collector electrode. The more positive DC voltage, after amplification by the gain control amplifier 22, is effective through the agency of the variable gain circuit of the amplifier 13 to increase the gain of this amplifier until the peak white signals again are restored to the desired amplitude.

During horizontal retrace intervals, the effect of the negative-going gating pulse 24 alone is to cause conduction through the diode 46 of the reference amplifier 26, thereby to bias the input transistor 42 to a substantially non-conducting state. This condition results in an increase in conduction in the collector-to-emitter circuit of the output transistor 43 such that a sufficiently high positive voltage is impressed upon the emitter electrode of the detector transistor 41 to render it completely inoperative. In this manner the detector 21 normally is rendered completely unresponsive to signal effects such as the white pulses occurring during horizontal retrace intervals.

This is a desired mode of operation in some applications of apparatus of the character under consideration. In a particular application, which will be described more fully subsequently, the present apparatus is provided with a connection including a resistor 65 whereby horizontal drive pulses 27 are combined with the gating pulses 24 to produce a composite control signal 66 for impression upon the base electrode of the input transistor 42 when automatic gain control of the video signal is being effected. The transistor 42 is, thus, rendered conducting during the entire trace period and also during that part of each retrace period in which the white pulse occurs. In other words, the peak detector 21 is operative at all times except at the beginning and end of the retrace period so that it can respond to either peak white video signals or to white pulses which normally are kept at a reduced amplitude, equal to no more than approximately one-third of the desired peak white video signal amplitude. It is by enabling the detector 21 to respond in this manner that the interlocking of the automatic sensitivity control apparatus and the automatic gain control apparatus is effective to prevent the undesired amplification of spurious signal effects produced during periods of little or no light on the pickup device. Further discussion of such a mode of operatioin will be given subsequently when the reason for it will be more readily understood.

The controlled gain video amplfier 13 includes a feedback pair of transistors 54 and 55. The video signal derived from the video amplifier 12 of FIGURE 1 is impressed upon the base electrode of the input transistor 54 in such polarity that white signals are negative-going and black signals are positive-going. Signal output from the input transistor 54 is derived from the collector electrode and impressed upon the base electode of the output transistor 55 which is connected as an emitter follower so that the output signal has such polarity that white is positive-going and black is negative-going.

A DC degenerative feedback path from the emitter electrode of the output transistor 55 to the base electrode of the input transistor 54 is provided by a circuit including a resistor 56. This resistor provides a fixed amount of feedback so as to maintain the operating points of the respective transistors 54 and 55 substantially constant. An AC degenerative feedback path from the output transistor 55 to the input transistor 54 is provided by a circuit including a capacitor 57 in series with the parallel arrangement of two variable resistors 58 and 59 which constitute a variable gain circuit for the amplifier 13. These resistors are of a photo-resistive type and include light sources 61 and 62 respectively. The light sources are connected in series and to the output of the gain control DC amplifier 22 from which they receive the DC control voltage produced in the manner previously described with reference to the operation of the peak detector 21. A variation of the DC energizing voltage for the light sources 61 and 62 produces variations in the magnitude of the resistors 58 and 59, thereby varying the AC feedback between the transistors 55 and 54 to produce a suitable variation in the gain of the amplifier 13.

The white pulse 17, after appropriate amplitude control by the white pulse amplifier 16, is impressed upon the base electrode of the input transistor 54 of the controlled gain video amplifier 13 by a circuit including a series arrangement of a coupling capacitor 63 and a resistor 64. By such means the white pulses 17 are added during horizontal retrace intervals to the video signal derived from the amplifier 12 of FIGURE 1 so as to produce at the output of the amplifier 13 a composite video signal for impression upon the video amplifier 19 of FIGURE 1.

When it is desired to manually control the gain of the video signal, a switch 67 at the gain control apparatus 18 is closed to operate the relay 47. The relay contact 53, in its operated position, disconnects the gain controlling potentiometer 52 at the control apparatus 18 from the gain control reference amplifier 26 and connects it to the white pulse amplifier 16 for a purpose to be described subsequently. The biasing of the gain control reference amplifier 26 under such conditions then is controlled only by the biasing circuits including the voltage divider 45 and the variable resistor 51 located at the camera or image pickup apparatus. The contact 48, in its operated position, of the relay 47 impresses the positive-going horizontal drive pulse 27 upon the circuit including the diode 46 of the amplifier 26. By means of such a pulse the amplifier 26 is operated so as to render the peak detector transistor 41 inoperative during horizontal trace intervals and to render this transistor capable of operation only during the horizontal retrace intervals. Thus, the peak detector 21 responds only to the white pulses which occur during the horizontal retrace intervals.

The white pulse 14 available at the terminal 15 is applied to the base electrode of a transistor 71 included in the white pulse amplifier 16. A fixed voltage derived from a voltage divider comprising resistors 72 and 73 is applied to the collector electrode of this transistor so that, in the absence of any other voltages applied to this electrode, there is produced a white pulse 17 having about one-third of the amplitude of the desired white peak video signal amplitude as previously described. Another voltage which is applied to the collector electrode of the transistor 71 during manual gain control operation is derived from the potentiometer 52 at the gain control apparatus 18. This latter voltage overrides the fixed voltage derived from the voltage divider resistors 72 and 73. The adjustment of the potentiometer 52, thus, controls the amplification of the white pulses so that, after they have been added to the video signal during the horizontal retrace intervals in the manner described, the gain control of the controlled gain video amplifier 13 is effected by the described detection of the white pulses by the peak detector 21. As indicated, a connection to the collector electrode of the transistor 71 from the target voltage limiter 39 enables the application of a white level overriding voltage to the white pulse amplifier 16 during automatic gain control operation so as to prevent the amplification of undesired spurious signal effects resulting from extreme sensitivity control of the pickup device and little or no energy impinging upon the pickup device.

Reference now is made to FIGURE 3 for a detailed description of the operation of apparatus by which the sensitivity of the video signal generating pickup device is automatically controlled. The pickup tube 11, for purposes of illustrative disclosure of the invention, is a photoconductive type such as a vidicon. The video signals derived from the target electrode 36 of the pickup tube are coupled by a capacitor 74 to the input circuit of the video amplifier 12. The amplified video signals derived from this amplifier, in addition to being applied to further signal processing apparatus such as the controlled gain video amplifier 13 are impressed upon the base electrode of an input transistor 75 of the automatic sensitivity control video amplifier 29. This transistor and an output transistor 76 are arranged as a feedback pair in which the collector electrode of the input transistor 75 is connected to a voltage supply through a series arrangement of two load resistors 77 and 78. The collector electrode of the input transistor 75 also applies the video signal amplified thereby to the base electrode of the output transistor 76, from the emitter electrode of which an output video signal is obtained. A bootstrap type of feedback circuit is provided by a capacitor 79. The amplifier, thus, can operate with relatively high level signals using only a relatively low voltage power supply.

The amplified video signals derived from the emitter electrode of the output transistor 76 are coupled to the base electrode of a transistor 81 of the automatic sensitivity control detector 31. These signals are effectively compared with the voltage impressed upon the emitter electrode of this transistor from a biasing circuit including a potentiometer 82, the adjustment of which effectively determines the desired level of the video signals which are derived from the amplifier 29 and the pickup tube 11 and which it is desired to maintain by controlling the sensitivity of the pickup tube. Thus, there is produced at the collector electrode of the detector transistor 81 a voltage representing any deviation in the video signal from the desired level of such signals.

The video signal level representative signal derived from the detector 31 is impressed upon the base electrode of a transistor 83, forming one part of the automatic sensitivity control output amplifier 34. This transistor is connected as an emitter follower, thereby producing at its emitter electrode an automatic sensitivity control voltage. This voltage is impressed upon the base electrode of a voltage controlling transistor 84 forming another part of the automatic sensitivity control amplifier 34. The output circuit of the transistor 84 includes a power supply 85, the negative terminal of which is connected through load resistors 86 and 87 and a low voltage power supply 88 to ground. The emitter electrode of the transistor 84 is connected to a target voltage controlling potentiometer 89 which is adjusted to the maximum effective target voltage at which it is desired to operate the pickup tube 11.

The voltage at the junction point of the power supply 85 and the load resistor 86 relative to ground varies as the conductivity of the transistor 84 varies under the control of the voltage impressed upon its base electrode. This varying voltage is applied between ground and the floating power supply 35, to which are connected the cathode 38 and other electron beam controlling electrodes of the pickup tube 11. Thus, as the voltage at the junction between the power supply 85 and the load resistor 86 of the control amplifier 34 varies, the voltages relative to ground which are applied to the cathode 38 and other beam controlling electrodes of the pickup tube 11 from the floating power supply 35 also vary relative to ground. Inasmuch as the target electrode 36 of the pickup tube 11 is maintained effectively at ground potential by the circuit including the resistor 37, the effective cathode-to-target voltage is varied as the level of the output signals from the pickup tube vary. In other words, the sensitivity of the pickup tube is varied within set limits in response to detected video signal level changes resulting from variations in the light admitted to the camera so as to maintain a substantially constant video signal output level from the pickup tube.

The apparatus including the detector 31 and the amplifier 34 are effectively disabled during the retrace intervals in which the pickup tube 11 is blanked by means (not shown) by the operation of a gating amplifier 32 so that the automatic sensitivity control apparatus operates only during trace periods in response to video signals. In this way all spurious signal effects which may occur during retrace intervals and which would undesirably affect the operation of the sensitivity control apparatus are rendered incapable of doing so. A transistor 91 which is conducting during trace intervals has gating pulses 24 present at the terminal 33 applied to its base electrode by a diode 92. A diode 93 connected between the emitter electrode of transistor 91 and the base electrode of transistor 81 acts as a level setter for the video signals. During trace intervals the transistor 91 conducts heavily so as to effectively ground the anode of diode 93 so that the transistor 81 detects positive-going white peaks of the video signal referenced to ground. During retrace intervals the negative-going portions of the gating pulse 24 render the transistor 91 nonconducting so that the diode 93 effectively references the signal from the amplifier 29 to a potential which is sufficiently negative to prevent any positive-going spurious signal effects from being detected by the transistor 81, thereby to render this transistor responsive only to the desired video signals derived from the amplifier 29.

The automatic sensitivity control apparatus of FIGURE 3 also includes a target voltage limiter 39 which essentially comprises a switch 94 and a plurality of Zener diodes 95, 96, 97 and 98. The switch 94, as indicated, is connected through the Zener diode 95 to the white pulse amplifier 16 of FIGURE 2 for the purpose of effectively disabling the controlled gain video amplifier 13 under conditions of a predetermined attained target voltage. With switch 94 connected to contact 99, for example, the limiter 39 is inoperative so long as the effective target control voltage derived from the amplifier 34, in combination with the voltage at the collector electrode of the white pulse amplifier transistor 71 of FIGURE 2, is less than a value required to break down the Zener diode 95 which, for example, may be approximately 36 volts. When this voltage is reached and breakdown of the Zener diode 95 occurs, an automatic white level overriding voltage is applied to the collector electrode of the transistor 71 of the white level amplifier 16 of FIGURE 2. This voltage is sufficiently negative to cause an increase in the amplitude of the white pulse 17 derived from the amplifier 16. This white pulse is of such magnitude that it functions to cause the automatic gain control apparatus of FIGURE 2 to reduce the gain of the amplifier 13 to the point that any spurious signals derived from the pickup tube are not amplified and, therefore, do not appear in the output from the signal generating apparatus.

Referring again to FIGURE 3, when the target limit switch 94 is placed on its contact 101 the Zener diode 96 is connected in series with the Zener diode 95. When, for example, the diode 96 has a breakdown voltage of approximately 6.2 volts, the automatic sensitivity control voltage applied to the floating power supply 35 is allowed to reach a value of approximately 42.2 volts relative to ground before an overriding voltage is applied to the white level control amplifier 16 of FIGURE 2. Higher levels of automatic sensitivity control voltages may be obtained before the limiting action occurs by connection of the switch 94 to contacts 102 or 103. The switch engagement with contact 102 connects another 6.2 volt Zener diode 97 in series with Zener diodes 95 and 96, thereby requiring a voltage of approximately 48.4 volts before limiting action takes place. When the switch 94 is placed on contact 103 a 20 volt Zener diode 98 is connected in series with the Zener diode 95, thereby requiring approximately 56 volts of target control voltage to be reached before the described limiting action occurs. It will be noted that the Zener diode 98 is permanently connected between the cathode 38 and the first grid 104 of the pickup tube 11 so as to maintain a fixed voltage relationship between these two tube electrodes.

Thus, it is seen that, by means of the described interlocking of the automatic sensitivity control apparatus and the automatic gain controlling apparatus there is prevented an undesired amplification of signals derived from the pickup device in which the spurious or noise signals are so great relative to the desired video signals that poor reproduction by such signals would be obtained. By the adjustment of such controls as the target voltage potentiometer 89 of the automatic sensitivity control amplifier 34 and the switch 94 of the target voltage limiter 39, the video signals derived from the pickup tube 11 of FIGURE 3 may be kept at a substantially constant level by means of the automatic sensitivity control apparatus. As the light input to the pickup tube 11 decreases the level of the video signals derived therefrom also decreases. The operation of the sensitivity control apparatus increases the effective cathode-to-target voltage of the pickup tube, thereby tending to produce video signals of the desired level even though the light input is decreased. The operation of the automatic gain control apparatus, in response to such video signals, functions to maintain the desired level of video signals in the output from the apparatus, such as from the video output amplifier 19.

In operating in this manner, however, there necessarily is an increase in the magnitude of the spurious signals derived from the pickup device in relation to the useful video signals. The target voltage limiting switch 94 is adjusted so that, when the useful video signal relative to the spurious signal derived from the pickup tube 11 reaches a limiting value, the impression of an automatic white level overriding voltage from the limiter 39 upon the white level amplifier 16 of FIGURE 2 causes this amplifier to produce a white pulse 17 of increased amplitude such as to take control of the automatic gain control apparatus away from the video signals. This is made possible by the described operation of the gain control reference amplifier 26 of FIGURE 2 which enables the gain control peak detector 21 to respond not only to the video signals during trace periods but also to the white pulses 17 during retrace periods.

When gain of amplifier 13 is being controlled automatically in response to peak white video signals and contacts 48 and 53 of relay 47 are in the illustrated unoperated positions, an additional safeguard feature is provided by the described impression upon the gain control reference amplifier 26 of both gating pulses 24 and horizontal drive pulses 27. Normally, when the video signals have a substantial level, the gain control peak detector 21 responds only to the video signals in comparison with the reference voltage derived from the amplifier 26. White pulse amplifier 16, however, is biased by the voltage divider comprising resistors 72 and 73 as described so as to produce white pulses 17 during retrace intervals having an amplitude which is approximately one-third of the desired amplitude of the video signals produced during trace periods. Should the video signals produced during trace periods fall below one-third of their desired amplitude, the automatic gain control apparatus responding to such signals tends to increase the gain of the amplifier 13. However, since the detector 21 is made to respond to the one-third amplitude white pulses during retrace periods, it will prevent the automatic gain control apparatus from increasing the gain of the amplifier 13 beyond a point which is determined by the one-third amplitude white pulses.

What is claimed is:

1. In a signalling system:

a transducer for producing a signal in response to and representative of energy impinging thereon;

means responsive to a variation of the level of said signal derived from said transducer to alter the sensitivity of said transducer;

a controlled gain amplifier having an input circuit coupled to receive said signal and an output circuit for normally producing an amplified version of said signal; and means responsive to a predetermined level of sensitivity of said transducer to alter the gain of said amplifier.

2. In a signalling system:

a transducer for producing an output signal in response to and representative of light energy impinging thereon;

means responsive to a variation of the level of the output signal derived from said transducer to alter the sensitivity of said transducer in a manner tending to maintain a substantially constant level of said produced output signal;

means for selectively limiting the maximum sensitivity of said transducer;

a controlled gain amplifier having an input circuit coupled to receive said output signal and an output circuit for normally producing an amplified version of said output signal; and means responsive to the attainment of said maximum transducer sensitivity to reduce the gain of said amplifier, thereby effecting substantially no amplification of said output signal.

3. In a signalling system:

a transducer for producing a signal in response to and representative of energy impinging thereon;

means responsive to a variation of the level of said signal derived from said transducer to alter the sensitivity of said transducer;

a controlled gain amplifier having an input circuit coupled to receive said signal and an output circuit for normally producing an amplified version of said signal;

first control means responsive to a variation of the level of said amplified signal version derived from the output circuit of said amplifier to alter the gain of said amplifier; and second control means responsive to a limit sensitivity of said transducer to override said first control means and to further alter the gain of said amplifier.

4. In a television camera control system:

a pickup tube for producing a video signal in response to and representative of a light image during each trace period of a scanning interval;

means responsive to a variation of the level of the video signal derived from said pickup tube to alter the sensitivity of said pickup tube in a manner tending to maintain a substantially constant level of said produced video signal;

means for selectively limiting the maximum sensitivity of said pickup tube;

a controlled gain amplifier having an input circuit coupled to receive said video signal and an output circuit for normally producing an amplified video signal; and means responsive to the attainment of said maximum pickup tube sensitivity to reduce the gain of said amplifier, thereby effecting substantially no amplification of said video signal.

5. In a television camera control system:

a pickup tube having a cathode, a target electrode and a plurality of intermediate electrodes for producing video signals in response to and representative of a light image;

means for applying to said target electrode a fixed potential relative to ground;

means including a power supply for applying to said cathode a potential different from and susceptible of being varied relative to said fixed potential;

means for producing a control voltage representative of a variation of the level of the video signals derived from said pickup tube;

means for impressing said control voltage on said power supply to vary the potential applied to said cathode relative to ground, thereby to alter the sensitivity of said pickup tube in a manner tending to maintain a substantially constant level of said video signals;

means for limiting the maximum potential difference between said cathode and said target electrode, thereby to limit the maximum sensitivity to said pickup tube;

amplifier means for said video signals; and means including an automatic gain control circuit coupled to said amplifier means and responsive to said maximum potential difference between said cathode and said target electrode for reducing the gain of said amplifier means.

6. In a television camera control system:

a pickup tube having a cathode, a target electrode and a plurality of intermediate electrodes for producing video signals in response to and representative of a light image;

means for applying to said target electrode a fixed potential relative to ground;

means including an ungrounded power supply for applying to said cathode and to said intermediate electrodes potentials having a fixed relationship to one another;

means for producing a control voltage representative of a variation of the level of the video signals derived from said pickup tube;

means for impressing said control voltage on said power supply to vary the potentials derived therefrom relative to ground, thereby to alter the sensitivity of said pickup tube suitably to maintain a substantially constant level of said video signals;

means for limiting the maximum potential difference between said cathode and said target electrode, thereby to limit the maximum sensitivity of said pickup tube;

amplifier means for said video signals;

automatic gain control means coupled to said amplifier means for maintaining a substantially constant level of the video signals derived from said amplifier means; and means responsive to said maximum potential difference between said cathode and said target electrode for causing said automatic gain control means to materially reduce the gain of said amplifier means.

7. In a television camera control system:

a pickup tube having a cathode, a target electrode and a plurality of intermediate electrodes for producing video signals in response to and representative of a light image;

means for applying to said target electrode a fixed potential relative to ground;

means including an ungrounded power supply for applying to said cathode and to said intermediate electrodes potentials having a fixed relationship to one another;

means for producing a control voltage representative of a detected variation of the level of the video signals derived from said pickup tube;

means for impressing said control voltage on said power supply to vary the potentials derived therefrom relative to ground, thereby to alter the sensitivity of said pickup tube suitably to maintain a substantially constant level of said video signals;

means for limiting the maximum potential difference between said cathode and said target electrode, thereby to limit the maximum sensitivity of said pickup tube;

amplifier means for said video signals;

automatic gain control means coupled to said amplifier means for maintaining a substantially constant level of the video signals derived from said amplifier means; and means responsive to said maximum potential difference between said cathode and said target electrode for causing said automatic gain control means to effectively disable said amplifier means.

8. In a television camera control system:

a pickup tube having a cathode, a target electrode and a plurality of intermediate electrodes for producing video signals in response to and representative of a light image;

means for applying to said target electrode a fixed potential relative to ground;

means including a power supply for applying to said cathode and to said intermediate electrodes potentials having a fixed relationship to one another;

means for detecting any variation of the level of said video signals derived from said pickup tube;

means coupled to said detecting means for producing a control voltage representative of said detected video signal level variation;

means for impressing said control voltage on said power supply to vary the potentials derived therefrom relative to ground, thereby to alter the sensitivity of said pickup tube in a sense and magnitude tending a maintain a substantially constant level of said video signals;

means for limiting the maximum potential difference between said cathode and said target electrode, thereby to limit the maximum sensitivity of said pickup tube;

amplifier means having an input coupled to receive video signals from said pickup tube and an output to deliver video signals to utilization means;

automatic gain control means coupled to receive video signals from the output of said amplifier means and operating normally to maintain a substantially constant level of the video signals derived from said amplifier means;

means responsive to said maximum potential difference between said pickup tube cathode and target electrode for developing an overriding voltage; and means responsive to said overriding voltage to condition said automatic gain control means suitably to reduce the gain of said amplifier means.

9. In a television camera control system:

a pickup tube having a cathode, a target electrode and a plurality of intermediate electrodes for producing video signals in response to and representative of a light image;

the ratio of useful video signals to spurious signals produced by said pickup tube being inversely related to the average amount of light impinging upon the tube;

means for grounding said target electrode for direct current;

means including a power supply for applying to said cathode and to said intermediate electrodes potentials having a fixed relationship to one another;

means for detecting any variation of the level of said video signals derived from said pickup tube;

means coupled to said detecting means for producing a control voltage representative of said detected video signal level variation;

means for impressing said control voltage on said power supply to vary the potentials derived therefrom relative to ground, thereby to alter the sensitivity of said pickup tube in a sense and magnitude tending to maintain a substantially constant level of said video signals;

means for limiting the maximum potential difference between said cathode and said target electrode to a selected value, thereby to limit the maximum sensitivity of said pickup tube and hence the maximum level of the spurious signals;

amplifier means having an input coupled to receive said video signals from said pickup tube and an output to deliver video signals to utilization means;

automatic gain control means coupled to receive video signals from the output of said amplifier means and operating normally to maintain a substantially constant level of the video signals derived from said amplifier means;

means responsive to said maximum potential difference between said pickup tube cathode and target electrode for developing an overriding voltage; and means responsive to said overriding voltage to effectively disable said amplifier means so as to minimize any amplification of said spurious signals.

10. In a television camera control system:

a pickup tube for producing a video signal in response to and representative of a light image during each trace period of a scanning interval;

means for varying the sensitivity of said pickup tube;

means for producing a first control voltage representative of a variation of the level of the video signals derived from said pickup tube;

means for impressing said control voltage upon said sensitivity varying means, thereby tending to maintain a substantially constant level of said produced video signals;

means for selectively limiting the maximum sensitivity of said pickup tube and for developing a second control voltage representative of said selected maximum pickup tube sensitivity;

means for producing a pulse of a variable amplitude during each retrace period of a scanning interval;

a controlled gain amplifier having an input circuit coupled to receive said video signal and said pulse and an output circuit for producing an amplified composite video and pulse signal;

means coupled to the output circuit of said amplifier and capable of response to said trace period video signals and to said retrace period pulses to produce a gain controlling voltage representative of the larger of said video signals and pulses relative to a selected reference level;

means for impressing said gain controlling voltage upon said amplifier to maintain the maximum picture white representative excursions of said video signal at a level relative to said reference level which normally is determined by said maximum video signal amplitude; and means for impressing said second control voltage upon said pulse producing means to increase the amplitude of the produced pulse to a value greater than the amplitude of said maximum picture white representative excursions of said video signal, thereby to reduce the gain of said amplifier.

11. In a television camera control system:

a pickup tube having a cathode and a target electrode for producing a video signal in response to and representative of a light image during each trace period of a scanning interval;

means for applying an operating voltage between said cathode and said target electrode;

means for producing a first control voltage representative of a detected variation of the level of the video signals derived from said pickup tube;

means for impressing said control voltage upon said operating voltage applying means to vary the voltage between said cathode and said target electrode, thereby to alter the sensitivity of said pickup tube suitably to maintain a substantially constant level of said produced video signals;

means for selectively limiting the maximum operating voltage between said cathode and said target electrode and for developing a second control voltage representative of said selected maximum operating voltage;

means for producing a pulse of a variable amplitude during each retrace period of a scanning interval;

a controlled gain amplifier having an input circuit coupled to receive said video signal and said pulse, a gain controlling circuit, and an output circuit for producing an amplified composite video and pulse signal;

means coupled to the output circuit of said amplifier to produce a gain controlling voltage representative of the larger of said video signals and pulses relative to a selected reference level;

means for impressing said gain controlling voltage upon the gain controlling circuit of said amplifier to maintain the maximum picture white representative excursions of said video signal at a level relative to said reference level which normally is determined by said maximum video signal amplitude; and means for impressing said second control voltage upon said pulse producing means to increase the amplitude of the produced pulse to a value greater than the amplitude of said maximum picture white representative excursions of said video signal, thereby to cause the said gain controlling circuit of said amplifier to reduce the gain of said amplifier.

12. In a television camera control system:

a pickup tube having a cathode and a target electrode for producing a video signal in response to and representative of a light image during each trace period of a scanning interval;

power supply means for applying an operating voltage between said cathode and said target electrode;

means for producing a first control voltage representative of a detected variation of the level of the video signals derived from said pickup tube;

means for impressing said control voltage upon said power supply means to vary the voltage between said cathode and said target electrode, thereby to alter the sensitivity of said pickup tube suitably to maintain a substantially constant level of said produced video signals;

means for selectively limiting the maximum operating voltage between said cathode and said target electrode and for developing a second control voltage representative of said selected maximum operating voltage;

means for producing a pulse of a variable amplitude during each retrace period of a scanning interval;

a controlled gain amplifier having an input circuit coupled to receive said video signal and said pulse, a gain controlling circuit, and an output circuit for producing an amplified composite video and pulse signal;

means coupled to the output circuit of said amplifier and capable of response to said trace period video signals and to said retrace period pulses to produce a gain controlling voltage representative of the larger of said video signals and pulses relative to a selected reference level;

means for impressing said gain controlling voltage upon the gain controlling circuit of said amplifier to maintain the maximum picture white representative excursions of said video signal at a level relative to said reference level which normally is determined by said maximum video signal amplitude; and means for impressing said second control voltage upon said pulse producing means to increase the amplitude of the produced pulse to a value substantially greater than the amplitude of said maximum picture white representative excursions of said video signal, thereby to cause the said gain controlling circuit of said amplifier to materially reduce the gain of said amplifier.

References Cited

UNITED STATES PATENTS

| | | | |
|---|---|---|---|
| 2,786,960 | 3/1957 | Palmer. | |
| 2,833,957 | 5/1958 | Horowitz | 315—10 |
| 2,911,562 | 11/1959 | Fathauer | 178—7.5 |
| 3,316,349 | 4/1959 | Loughlin | 178—7.2 |
| 3,339,018 | 8/1967 | Brown | 178—7.2 |

RICHARD MURRAY, *Primary Examiner.*

A. H. EDDLEMAN, *Assistant Examiner.*

U.S. Cl. X.R.

315—10